United States Patent
Feinleib

(12) 
(10) Patent No.: US 6,343,360 B1
(45) Date of Patent: Jan. 29, 2002

(54) AUTOMATED CONFIGURATION OF COMPUTING SYSTEM USING ZIP CODE DATA

(75) Inventor: David Feinleib, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/311,176

(22) Filed: May 13, 1999

(51) Int. Cl.$^7$ .......................... G06F 15/177; G06F 1/24
(52) U.S. Cl. ........................................................ 713/1
(58) Field of Search .......................... 705/26–28; 713/1, 713/2, 100

(56) References Cited

U.S. PATENT DOCUMENTS 5,495,608 A * 2/1996 Antoshenkov ............... 395/600
6,125,356 A * 9/2000 Brockman et al. ............ 705/37
6,151,707 A * 11/2000 Hecksel et al. ............... 717/11

* cited by examiner

Primary Examiner—John Breene
Assistant Examiner—Susan F. Rayyan
(74) Attorney, Agent, or Firm—Lee & Hayes, PLLC

(57) ABSTRACT

A computing system uses a zip code entered by the user during a first boot sequence to automatically configure itself. The computing system includes a computing device (e.g., computer, laptop, handheld device, smart appliance, etc.) and a zip code database. The zip code database may reside locally at the computing device, or remotely at a server accessible by the computing device over a network. The zip code database correlates zip codes with corresponding configuration information that can be derived from the zip code (e.g., city, state, time zone, area code, and daylight savings settings). During a first boot sequence (i.e., a process executed when the user turns on the computer for the first time), the computing device prompts a user to enter a zip code. The computing device passes the zip code to the zip code database either locally, or over a network. The zip code is then used to look up the corresponding configuration information in the zip code database. The configuration information is returned and used to configure the computing device. The configuration information may be used to populate data fields presented in a graphical user interface for the user to review and confirm its accuracy.

42 Claims, 3 Drawing Sheets

AUTOMATED CONFIGURATION OF COMPUTING SYSTEM USING ZIP CODE DATA

TECHNICAL FIELD

This invention relates to computer systems and particularly, to automated configuration of a computers system based on a user-supplied zip code for an area within which the computer system resides.

BACKGROUND

The ways in which people use computers are continually evolving and expanding. As a result, it is beneficial for computer and software manufacturers to have information on the manner in which computers and software are used, as well as information on the users themselves. Having such information assists the manufacturers in designing computers and software that are more useful and better aligned with what users want.

One approach to obtaining such information is to collect "registration information" from the user and transmit it to the manufacturer. Registration information refers to demographic and other information regarding the user and the user's computer, such as information regarding the user's intended use of the computer or software, the user's preferred activities, hobbies, other computer hardware or software components or peripherals that are being used in conjunction with the computer or software, etc. The registration information may also include information regarding the computer itself (e.g., identification numbers, processor type, amount of memory, connected peripheral devices, etc.).

Registration information is typically collected via one or more "registration wizards", each of which is a program that is executed when the computer is initially set up by the user or when the software is first installed. The registration wizard asks the user various questions to elicit the registration information. The wizard may also interrogate the computer itself to obtain information (e.g., processor type) regarding the computer. There is typically a different registration wizard for the computer, one or more of the software programs being run on the computer, and sometimes for additional peripheral devices coupled to the computer (e.g., printers or scanners).

Once the registration information is collected, the registration wizard transmits or "uploads" the collected information to a registration database, from which a manufacturer is able to subsequently retrieve the collected information. The registration database is typically accessed via a network (e.g., the Internet), or via a direct-connection (e.g., a direct phone call to a computer system maintaining the registration database).

As an example, a popular "first boot sequence" (i.e., the process that is run the first time the user turns on the machine) for a computer that runs the Windows 98 operating system from Microsoft Corporation is as follows:

User turns on the computer.

An initial screen prompts user to enter User Name, End User License Agreement, and Product Key.

The computer displays a "Time Zone/Time" dialog, and requests that the user configure these settings manually.

The registration application runs and requests the user to enter user information, such as user name, address (including zip code), phone number information, and optionally, credit card information. The information is transmitted via a dial up modem connection to Microsoft Corporation and/or the computer manufacturer. Some information (such as a registration ID) is transmitted from the server back to the user's computer.

An Internet Service Provider (ISP) signup application is launched to allow the user to sign up for Internet access. The user may be asked to reenter his/her name, address, phone number, email address, and so forth. A phone call is made to a server, normally via an 1-800 number; and the user's information is transmitted. Some configuration information is sent back to the user, such as settings that allow the user to communicate properly with the ISP as well as local dial-up access numbers.

The user continues with other configuration matters or begins using Windows, the Web browser, or other applications.

Any application installed on the machine may launch its own wizard that requests the user to reenter the information.

One drawback with this conventional registration approach is that it is an inconvenience to the user. The user is asked to enter a lot of information primarily as a courtesy and benefit to the manufacturers. The user fills in many forms, which are typically presented in graphical user interface windows, and in some cases repeatedly enters the same information for the benefit of multiple different wizards.

This drawback is particularly annoying for the newer classes of small-size computers and portable computing devices that have limited user interface capabilities. Some small computing devices have limited screen space and are unable to present full registration forms. Other computing devices have limited data input mechanism that render it difficult for a user to enter all of the requested information.

Accordingly, the invention described below addresses this drawback of the prior art by providing a way to reduce or minimize the amount of information a user enters during initial configuration.

SUMMARY

This invention concerns automated configuration of a computing system using zip code data entered by the user during a first boot sequence.

In one implementation, the computing system includes a computing device (e.g., computer, laptop, handheld device, smart appliance, etc.) and a zip code database. The zip code database may reside locally at the computing device, or remotely at a server that is accessible by the computing device over a network. The zip code database correlates zip codes with corresponding configuration information that can be derived from the zip code (e.g., city, state, time zone, area code, and daylight savings settings).

During a first boot sequence (i.e., a process executed when the user turns on the computer for the first time), the computing device prompts a user to enter a zip code via a graphical user interface or some other means. The computing device passes the zip code to the zip code database either locally, or over a network. The zip code is then used to look up the corresponding configuration information in the zip code database. The configuration information is returned and used to configure the computing device. The configuration information may optionally be used to populate data fields presented in a graphical user interface for the user to review and confirm its accuracy.

DETAILED DESCRIPTION

This invention concerns automated configuration of computing systems using zip code data entered by the user during a first boot sequence. The invention can be implemented in a wide variety of computing machines, including general purpose computing devices (e.g., desktop computers, portable computers, handheld computers, etc.), task oriented computing devices (e.g., portable digital assistants, set-top boxes, etc.) and other smart appliances (e.g., Web telephone, pagers, etc.). For discussion purposes, two exemplary computing systems are described: a desktop computer and a portable device representative of a handheld computer or a task oriented computing device.

Exemplary Systems

Figure 1:
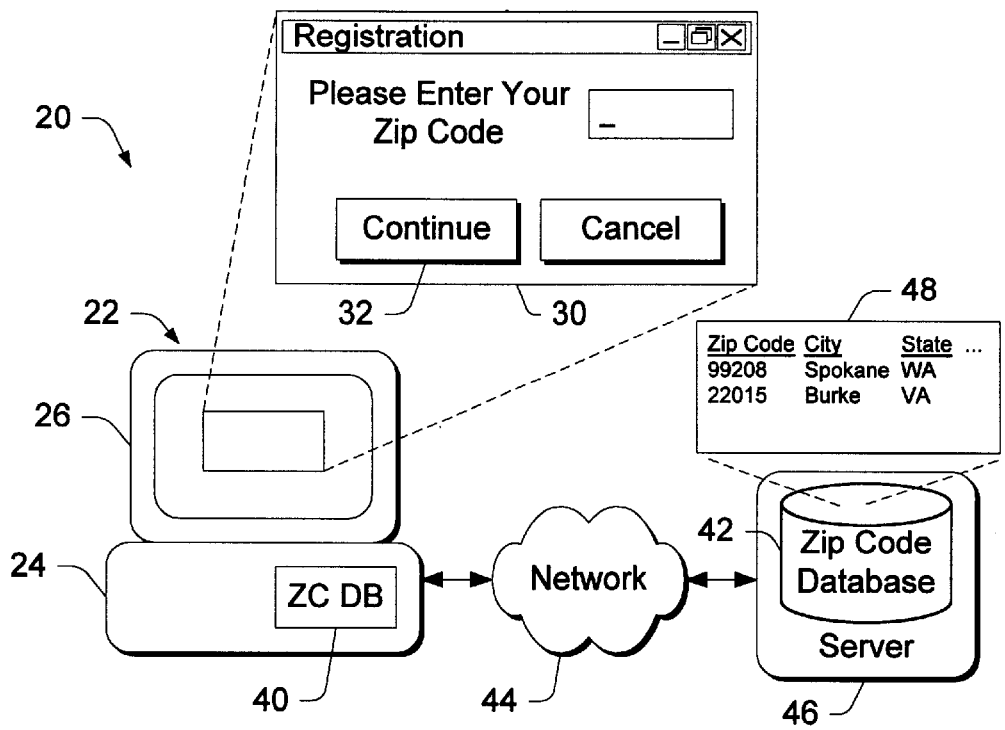
FIG. 1 shows a desktop computer during a first boot sequence.

FIG. 1 shows a computing system 20 having a computer 22 embodied as a desktop computer. The computer 22 has a base unit 24 that houses a CPU (central processing unit), memory, bus architecture, power system, network card and/ or modem, and other components. The computer 22 also has a monitor 26 to provide a visual graphical user interface. The computer 22 runs an operating system, such as a Windows-brand operating system from Microsoft Corporation.

When the computer is booted for the first time, it runs a first boot sequence that asks the user to enter information used to configure the hardware and/or software. FIG. 1 illustrates the computer at an early point in the first boot sequence, shortly after the user first turns on the machine.

At this early point, the computer displays a graphical user interface ("GUI" or "graphical UI") window or dialog box 30 that prompts the user to enter his/her zip code. The user enters the zip code using a keyboard or some other input mechanism, and the numbers appear in the window 30. If the number is correct, the user presses the continue button 32 to continue with the first boot sequence.

The computer 22 uses the zip code information to automatically configure parameters of the hardware and/or software. From the zip code, information such as city, state, time zone, area code, and daylight savings can be automatically determined. The computer 22 uses the information to configure itself, storing the information locally and configuring the system clock.

The information can be derived from one of two sources: (1) a local zip code database (ZC DB) 40 stored in the computer's memory; or (2) a remote zip code database 42 that is accessible over a network 44. The remote zip code database 42 resides at a remote server 46, which represents a network server, a Web server at a Web site of the computer manufacturer or ISP (Internet Service Provider), or some other server computer. Depending on where the remote zip code database 42 is located and how it is implemented, the network 44 used to access it may be implemented in a variety of ways, including the Internet, a telephone network, a cable TV network, and so forth.

The zip code databases 40, 42 correlate zip codes with other configuration information that can be derived from or is associated with the zip codes. In FIG. 1, a data structure 48 in remote database 42 correlates the zip code with corresponding configuration information such as city, state, and so forth. Other information might include time zone, area code, and daylight savings. Local database 40 stores a similar data structure.

In the case of the local zip code database 40, the zip code information is used as a query into the database 40 to access corresponding configuration information. No phone call or other connection to a remote source is needed in this case.

In the case of the remote zip code database 42, the computer 22 connects to an external source and sends the zip code data over the network 44 to the server 46. This connection can be combined with the traditional connection made as part of the registration process to transmit the user's registration information or to sign up for an ISP. The server 46 uses the zip code to query the zip code database 42. The server 46 retrieves the configuration information derived form the zip code data and returns it to the computer 22. The computer then utilizes the information to configure itself, storing that information locally and configuring its clock.

The computer 22 may optionally populate various data fields, such as city, state, telephone area code, and so forth. These data fields are presented in a graphical user interface so that the user can check the information for accuracy and confirm the information as correct. In this manner, the user enters a single zip code parameter and the computer system automatically populates other query fields that the user is traditionally asked to provide. The automated process reduces the amount of information the user needs to enter, such as city and state. The Time/Time Zone configuration application can also be removed from the first boot sequence, since this information can be automatically determined from the zip code. In addition, the telephone area code query can be removed from registration or ISP signup. In each case, the information can be presented for confirmation by the user, rather than requiring the user to enter it once or repeatedly for multiple applications.

As noted above, the local zip code database offers the advantage that no phone call is necessary. However, it has a drawback in that a locally stored database may be out dated by the time the user receives the machine and turns it on. For instance, PCs (personal computers) bought at a retail location are often configured and shipped months before a customer ever takes one home and turns it on.

The remote zip code database offers the advantage that it can be continually updated with the latest information, but at the slight inconvenience of requiring some sort of connection. However, a phone call is normally made to transmit the user's registration information to the software or computer manufacturer, so the slight advantage of eliminating a phone call may not be that significant. Moreover, while the user's PC is connected to the remote server, the server can also transmit correct time information back to the user.

Figure 2:
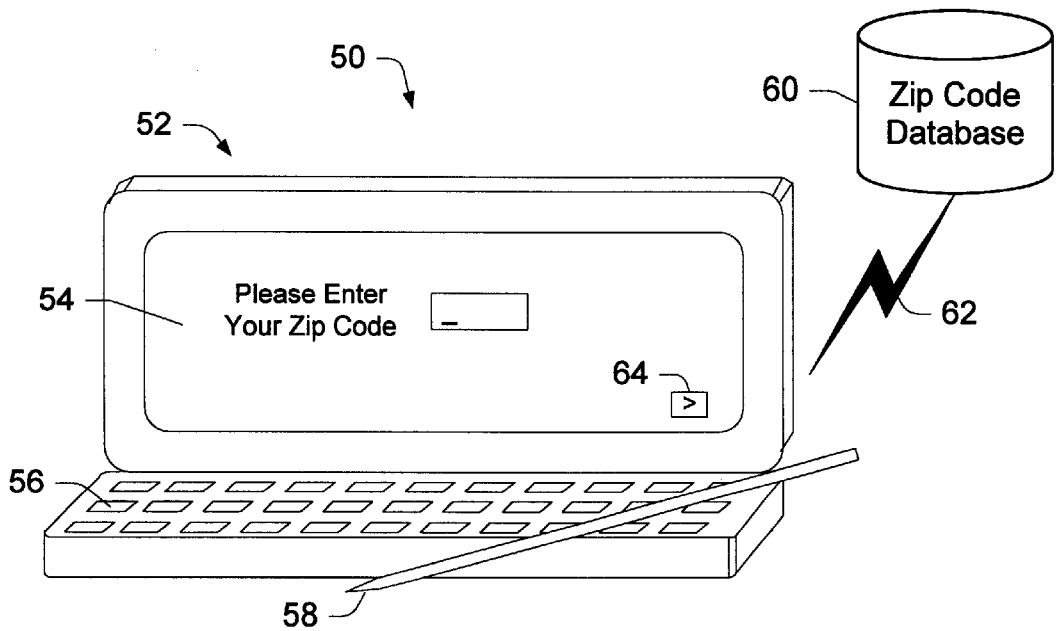
FIG. 2 shows a handheld computer during a first boot sequence.

FIG. 2 shows a computing system 50 having a computing device 52 embodied as a portable handheld computer. The computing device has a small, LCD (liquid crystal display) touch-sensitive screen 54, a miniaturized keyboard 56, and a stylus 58. This embodiment is representative of many classes of computing devices that have limited screen space and limited input capabilities, exemplified here by the miniaturized keyboard and stylus input mechanisms.

The computing device 52 has a wireless transceiver (e.g., RF transceiver) that allows a wireless connection with a remote database 60 via a wireless network 62 (e.g., RF network, satellite network, etc.). When the computing device is turned on for the first time, it runs a first boot sequence. FIG. 2 shows an early screen display during the first boot sequence.

The device 52 asks the user to enter his/her zip code using a UI window or dialog box (e.g., handheld device that runs Windows CE operating system), or via a line prompt. The user enters the zip code using the keyboard 56 or using the stylus 58 and touch-sensitive screen 54. If the number is correct, the user presses a continue button 64 to continue the first boot sequence.

Once the user continues the sequence, the computing device 52 connects to an external server (not shown in FIG. 2) via the wireless network connection 62. The computing device 52 sends the zip code data to the server, where it is used to access the remote zip code database 60. The server returns the configuration information derived from the zip code and the computing 52 uses the information configure different parameters and its clock.

One exemplary implementation of the automated configuration process is described below under the heading "Operation" and with reference to FIG. 4. Prior to explaining this process, however, an exemplary implementation of a computer used to implement the general-purpose computer 22 in FIG. 1 is described.

Exemplary Computer

Figure 3:
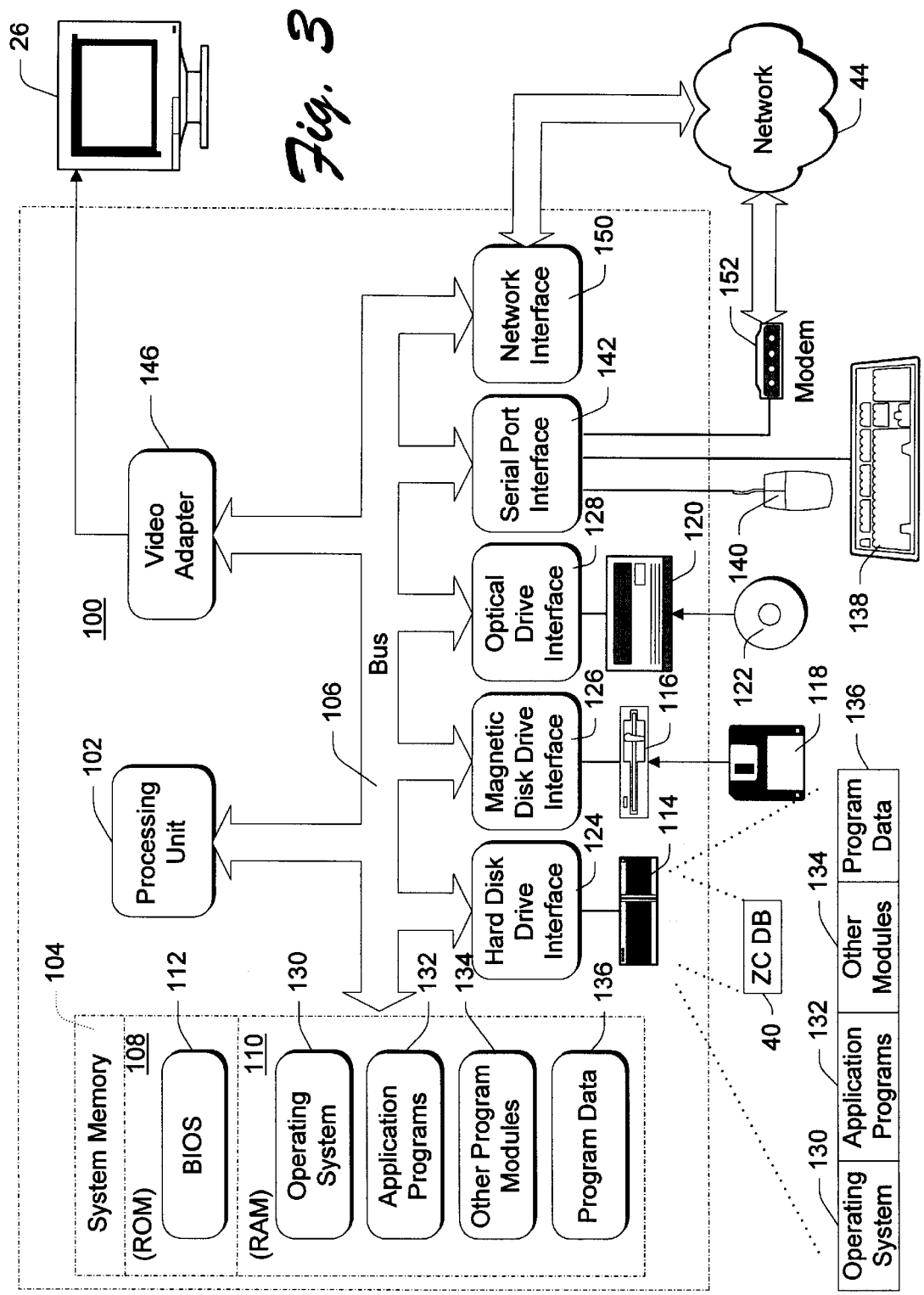
FIG. 3 shows an exemplary computer architecture.

FIG. 3 shows an exemplary implementation of the computer 22 from FIG. 1. The computer is a general-purpose computing device in the form of a conventional personal computer 100.

Computer 100 includes a processing unit 102, a system memory 104, and a bus 106 that couples various system components including the system memory 104 to the processing unit 102. The bus 106 represents one or more of any of several types of bus structures, including a memory bus or memory controller, a peripheral bus, an accelerated graphics port, and a processor or local bus using any of a variety of bus architectures. The system memory 104 includes read only memory (ROM) 108 and random access memory (RAM) 110. A basic input/output system 112 (BIOS) is stored in ROM 108.

Computer 100 also has one or more of the following drives: a hard disk drive 114 for reading from and writing to a hard disk, a magnetic disk drive 116 for reading from or writing to a removable magnetic disk 118, and an optical disk drive 120 for reading from or writing to a removable optical disk 122 such as a CD ROM or other optical media. The hard disk drive 114, magnetic disk drive 116, and optical disk drive 120 are connected to the bus 106 by a hard disk drive interface 124, a magnetic disk drive interface 126, and an optical drive interface 128, respectively. The drives and their associated computer-readable media provide nonvolatile storage of computer readable instructions, data structures, program modules and other data for the personal computer. Although a hard disk, a removable magnetic disk and a removable optical disk are described, other types of computer readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 130, one or more application programs 132, other program modules 134, and program data 136. In addition, the local zip code database 40 may also be stored on the hard disk or other memory device (e.g., non-volatile RAM).

A user may enter commands and information into the personal computer 100 through input devices such as keyboard 138 and pointing device 140. Other input devices (not shown) may include a microphone, joystick, game pad, satellite dish, scanner, or the like. These and other input devices are often connected to the processing unit 102 through a serial port interface 142 that is coupled to the bus 106, but may be connected by other interfaces, such as a parallel port, game port, or a universal serial bus (USB).

A monitor 26 or other type of display device is connected to the bus 106 via an interface, such as a video adapter 146. The monitor 26 is used to present the GUI window during the first boot sequence. In addition to the monitor, personal computers typically include other peripheral output devices (not shown) such as speakers and printers.

The server computer 100 is connected to the network 44 through a network interface or adapter 150, a modem 152, or other means for establishing communications over the network. The modem 152, which may be internal or external, is connected to the bus 106 via the serial port interface 142.

Operation

The computer systems shown above enables automated configuration based on entry of a user's zip code. The process helps reduce the amount of time a user spends entering information, which is mostly for the benefit of the computer manufacturer or software manufacturer.

Figure 4:
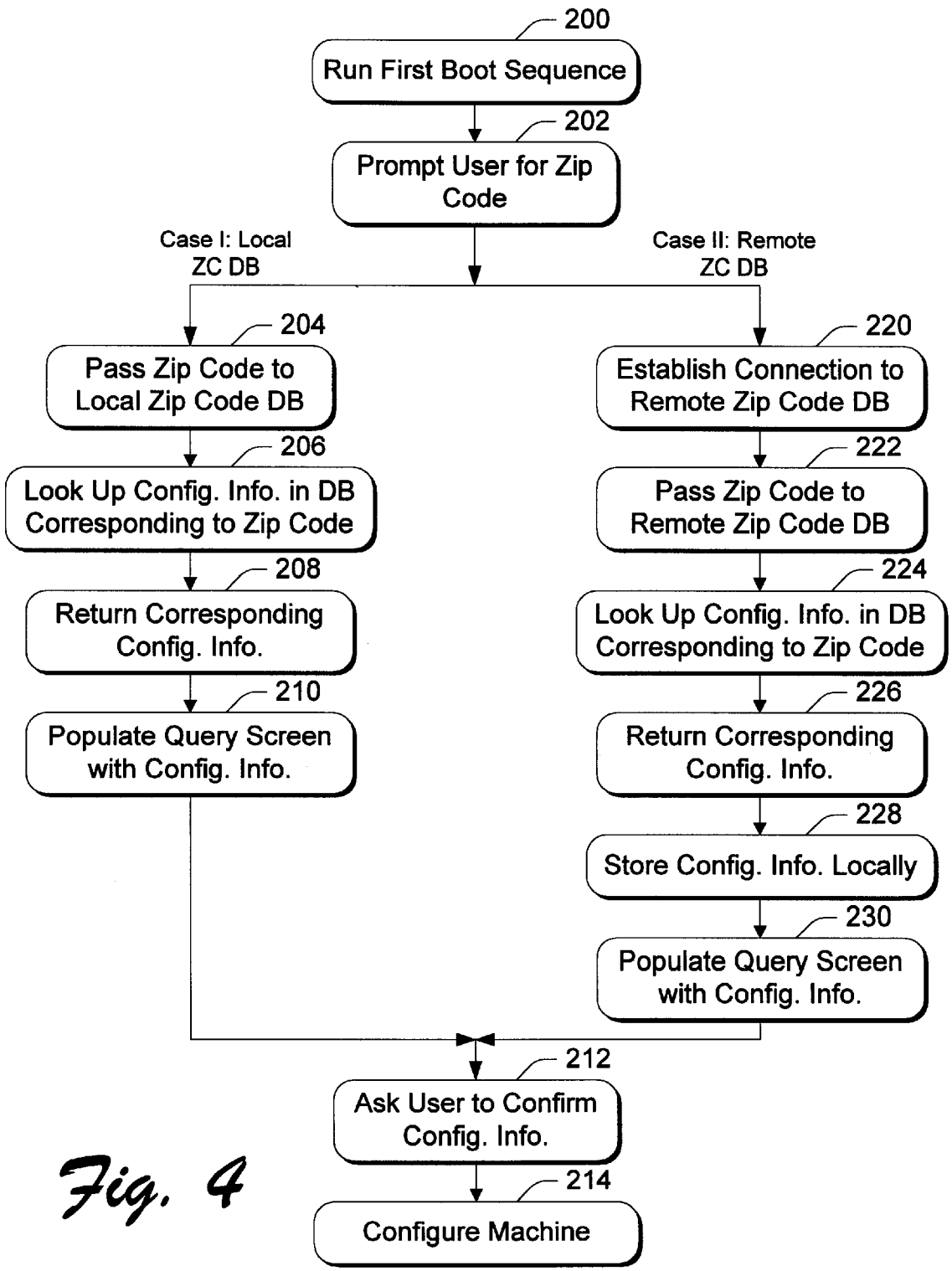
FIG. 4 is a flow diagram showing a first boot configuration sequence.

FIG. 4 shows the automated configuration process for the two different cases: a local zip code database and a remote zip code database. Two different paths through the flow diagram distinguish the processes for the different cases. The process can be performed in software, hardware, or a combination of hardware and software, and is described with reference to the architectures of FIGS. 1 and 2.

At step 200, the user powers up the machine for the first time and the machine begins running the first boot sequence. During this sequence, the user is prompted to enter a zip code (step 202). This prompt can be in the form of a graphical UI window or box (FIG. 1), a line prompt (FIG. 2), or some other request that asks the user to enter his/her zip code.

The process at this point differs slightly depending upon whether the computing device is implemented with a local zip code database (case I) or a remote zip code (case II). For local zip code database (i.e., case I in FIG. 4), the user-supplied zip code is passed to the local zip code database 40 (step 204). Using the zip code as a query or key, the computer looks up configuration information in the database that corresponds to the zip code (step 206). The configuration information may include city name, state name, time zone, telephone area code, and daylight savings settings.

The configuration information is returned from the database (step 208) and used to populate future query screens used in the setup and registration processes (step 210). That is, as the user is guided through initial screens to configure the computer and to register the hardware and software with the appropriate vendor or manufacturer, the configuration information obtained from the local zip code database is automatically entered into the query fields for presentation to the user. In this manner, much of the information that the user traditionally entered is now automatically filled in.

At step 212 in FIG. 4, the user is asked to confirm that the automatically entered data from the configuration information is accurate. For example, the data entry screen shows the city name, time zone, and so forth entered into the appropriate fields and offers a "confirm" button that the user can click or actuate if the information is accurate. Assuming the information is confirmed as accurate, the computer uses the information to configure the machine (step 214).

Now, consider the case of the remote zip code database (i.e., case II in FIG. 4). At step 220, the computer establishes a connection to a remote zip code database 42, 60 via a wire-based or wireless network. The user-entered zip code is transmitted over the network to the remote zip code database 42, 60 (step 222). The remote database server looks up configuration information in the database that corresponds to the zip code (step 224).

The configuration information is transmitted back from the database server over the network (step 226) and stored locally in memory of the computer (step 228). The configuration information is then used to populate query screens used in the setup and registration processes (step 230). The user confirms the accuracy (step 212) and the computer configures itself using the configuration information (step 214).

The process is advantageous over prior art systems in that much of the configuration information is automatically entered for the user. The user is left with minimal amounts of information that cannot be automatically determined, such as user name, user address, and telephone number (after area code).

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for operating a computing device during an initial first boot sequence, comprising:

prompting a user to enter a zip code;

determining corresponding configuration information from the zip code; and using the configuration information to configure the computing device.

2. A method as recited in claim 1, wherein the prompting comprises presenting a graphical user interface that requests the user to enter the zip code.

3. A method as recited in claim 1, wherein the determining comprises looking up the configuration information in a data structure.

4. A method as recited in claim 1, wherein the determining comprises querying a local database to lookup the configuration information.

5. A method as recited in claim 1, wherein the determining comprises:

passing the zip code over a network to a remote site, the remote site having a database that correlates the zip code and corresponding configuration information;

querying the database at the remote site using the zip code to lookup the corresponding configuration information; and returning the configuration information from the remote site.

6. A method as recited in claim 1, further comprising populating data fields with the configuration information.

7. A method as recited in claim 1, wherein the configuration information includes a time setting, and the using the configuration information comprises automatically configuring the time/date parameters of the computing device with the time setting.

8. A method as recited in claim 1, wherein the configuration information includes a city name and a state name, and the using the configuration information comprises automatically configuring the city and state names for the computing device.

9. A method as recited in claim 1, wherein the configuration information includes a telephone area code, and the using the configuration information comprises automatically configuring the telephone area code for the computing device.

10. A method for operating a computing device, comprising:

executing an initial first boot sequence; and during the initial first boot sequence, receiving a zip code, looking up corresponding configuration information based on the zip code, and populating data fields used to configure the computing device with the configuration information.

11. A method as recited in claim 10, further comprising presenting the configuration information to a user and prompting the user to confirm accuracy of the configuration information.

12. A method as recited in claim 10, farther comprising configuring the computing device using the configuration information.

13. A method as recited in claim 10, wherein the configuration information includes a time setting, and further comprising automatically configuring the time/date parameters of the computing device with the time setting.

14. A method as recited in claim 10, wherein the configuration information includes a city name and a state name, and further comprising automatically filling in data fields holding the city name and the state name.

15. A method as recited in claim 10, wherein the configuration information includes a telephone area code, and fur comprising automatically filling in a data field holding the telephone area code.

16. A method for operating a computing device, comprising:

executing an initial first boot sequence, comprising:

receiving a zip code;

establishing a connection to a remote database server, the database server correlating zip codes with corresponding configuration information;

passing the zip code to the database server;

looking up the corresponding configuration information correlated with the zip code at the database server;

returning the configuration information from the database server to the computing device;

storing the zip code at the computing device;

is populating data fields used to configure the computing device with the configuration information; and prompting the user to confirm accuracy of the configuration information.

17. A method as recited in claim 16, wherein the establishing comprises connecting to the remote database server over the Internet.

18. A method as recited in claim 16, wherein the establishing comprises connecting to the remote database server over a wireless network.

19. A method as recited in claim 16, further comprising configuring the computing device using the configuration information.

20. A method as recited in claim 16, wherein the configuration information includes a time setting, and further comprising automatically configuring the time/date parameters of the computing device with the time setting.

21. A method as recited in claim 16, wherein the configuration information includes a city name and a state name, and further comprising automatically filling in data fields holding the city name and the state name.

22. A method as recited in claim 16, wherein the configuration information includes a telephone area code, and further comprising automatically filling in a data field holding the telephone area code.

23. A system comprising:
   a computing device;
   a zip code database that correlates zip codes and corresponding configuration information; and
   the computing device prompting a user, during an initial first boot sequence, to enter a zip code and using the zip code to look up the corresponding configuration information in the zip code database.

24. A system as recited in claim 23, wherein the computing device has a screen and presents a graphical user interface on the screen to prompt the user to enter the zip code.

25. A system as recited in claim 23, wherein the zip code database resides at the computing device.

26. A system as recited in claim 23, wherein the zip code database is remote from the computing device.

27. A system as recited in claim 23, wherein the zip code database is remote from the computing device, and the computing device passes the zip code over a network to the remote zip code database where the zip code is used to query the zip code database to lookup the corresponding configuration information.

28. A system as recited in claim 23, wherein the computing device populates data fields used in configuring the computing device with the configuration information.

29. A system as recited in claim 23, wherein the configuration information includes a time setting, and the computing device automatically configures the time/date parameters with the time setting.

30. A system as recited in claim 23, wherein the configuration information includes a city name and a state name, and the computing device automatically configures the city and state names.

31. A system as recited in claim 23, wherein the configuration information includes a telephone area code, and the computing device automatically configures the telephone area code for the computing device.

32. A system comprising:
   a portable computing device having a processor, memory, a small-area screen, a data entry mechanism, and a transceiver for data communication;
   a zip code database server remote from the portable computing device, the zip code database server correlating zip codes with corresponding configuration information; and
   the computing device prompting a user, during an initial first boot sequence, to enter a zip code;
   the computing device establishing a data connection with the zip code database server and sending the zip code from the transceiver to the zip code database server;
   the zip code database server determining the corresponding configuration information from the zip code and returning the configuration information back to the computing device; and
   the computing device storing the configuration information in the memory.

33. A system as recited in claim 32, wherein the computing device populates data fields used in configuring the computing device with the configuration information.

34. A system as recited in claim 32, wherein the configuration information includes a time setting, and the computing device automatically configures the time/date parameters with the time setting.

35. A system as recited in claim 32, wherein the configuration information includes a city name and a state name, and the computing device automatically configures the city and state names.

36. A system as recited in claim 32, wherein the configuration information includes a telephone area code, and the computing device automatically configures the telephone area code for the computing device.

37. One or more computer-readable media storing computer-executable instructions for:
   executing an initial first boot sequence; and
   during the initial first boot sequence, receiving a user-entered zip code and determining corresponding configuration information from the zip code that can be used to configure a computing device.

38. One or more computer-readable media as recited in claim 37, further comprising computer-executable instructions for configuring the computing device using the configuration information.

39. One or more computer-readable media as recited in claim 37, further comprising computer-executable instructions for populating data fields used to configure the computing device with the configuration information.

40. One or more computer-readable media as recited in claim 37, wherein the configuration information includes a time setting, and further comprising computer-executable instructions for automatically configuring the time/date parameters with the time setting.

41. One or more computer-readable media as recited in claim 37, wherein the configuration information includes a city name and a state name, and further comprising computer-executable instructions for automatically configuring the city and state names.

42. One or more computer-readable media as recited in claim 37, wherein the configuration information includes a telephone area code, and further comprising computer-executable instructions for automatically configuring the telephone area code for the computing device.

* * * * *

UNITED STATES PATENT AND TRADEMARK OFFICE
CERTIFICATE OF CORRECTION

PATENT NO. : 6,343,360 B1
DATED : January 29, 2002
INVENTOR(S) : Feinleib

It is certified that error appears in the above-identified patent and that said Letters Patent is hereby corrected as shown below:

Column 8,
Line 20, change "farther" to -- further --.
Line 33, change "fur" to -- further --.
Line 49, delete "is" before "populating".

Signed and Sealed this

Eighteenth Day of June, 2002

Attest:

Attesting Officer

JAMES E. ROGAN
Director of the United States Patent and Trademark Office